United States Patent
Taka (10) Patent No.: US 8,154,979 B2
(45) Date of Patent: Apr. 10, 2012

(54) OBJECTIVE LENS AND OPTICAL PICKUP APPARATUS

(75) Inventor: Kunihiko Taka, Musashino (JP)

(73) Assignee: Konica Minolta Opto, Inc., Tokyo (JP)

( * ) Notice: Subject to any disclaimer, the term of this patent is extended or adjusted under 35 U.S.C. 154(b) by 430 days.

(21) Appl. No.: 12/198,617

(22) Filed: Aug. 26, 2008

(65) Prior Publication Data

US 2009/0059769 A1    Mar. 5, 2009

(30) Foreign Application Priority Data

Aug. 28, 2007    (JP) ................................ 2007-221222

(51) Int. Cl.
*G11B 7/00*     (2006.01)
(52) U.S. Cl. ............ 369/112.23; 369/44.23; 369/112.01; 369/112.26; 359/582; 359/589; 359/581
(58) Field of Classification Search ............. 369/112.23, 369/44.23, 112.19, 112.01, 112.21, 112.28, 369/112.29; 349/12; 359/582, 586, 580, 359/833
See application file for complete search history.

(56) References Cited

U.S. PATENT DOCUMENTS

| | | | |
|---|---|---|---|
| 2005/0007934 A1* | 1/2005 | Ohta et al. | 369/112.23 |
| 2006/0018237 A1* | 1/2006 | Sugi et al. | 369/112.23 |
| 2006/0023131 A1* | 2/2006 | Takano et al. | 349/12 |
| 2007/0030569 A1* | 2/2007 | Lu et al. | 359/586 |
| 2008/0192350 A1* | 8/2008 | Yamada et al. | 359/582 |
| 2009/0135492 A1* | 5/2009 | Kusuda et al. | 359/601 |

FOREIGN PATENT DOCUMENTS

| | | |
|---|---|---|
| JP | 2005-31361 | 2/2005 |
| JP | 2005-38581 | 2/2005 |

* cited by examiner

*Primary Examiner* — Wayne Young
*Assistant Examiner* — Dionne Pendleton
(74) *Attorney, Agent, or Firm* — Finnegan, Henderson, Farabow, Garrett & Dunner, L.L.P.

(57) ABSTRACT

Disclosed is an objective lens used for an optical pickup apparatus to perform writing and/or reading of an optical information recording medium, comprising an antireflective film on a surface of a light source side, wherein a light flux of wavelengths including a wavelength λ1 of 380 nm≦λ1≦420 nm and a wavelength λ2 of 630 nm≦λ2≦810 nm, is condensed on the medium, a numerical aperture on the light source side with respect to the wavelength λ1 is within a range of 0.8-0.9, and that with respect to the wavelength λ2 is 0.7 or less, and a band of the antireflective film is within a range of 700 nm-800 nm in a state where a reflectance of a light flux perpendicularly entering a central portion of the surface in a wavelength region from 400 nm to 1200 nm is 3.0% or less.

13 Claims, 5 Drawing Sheets

OBJECTIVE LENS AND OPTICAL PICKUP APPARATUS

BACKGROUND OF THE INVENTION

1. Field of the Invention

The present invention relates to an objective lens used for an optical pickup apparatus for an information recording and reproducing apparatus capable of performing at least one of the recording of information onto an optical information recording medium and the reproducing of the information recorded on the optical information recording medium, and to an optical pickup apparatus equipped with the objective lens. In particular, the present invention relates to an objective lens to condense a plurality of light fluxes including at least a light flux of a wavelength within a range from 380 nm to 420 nm and a light flux of a wavelength within a range from 630 nm to 810 nm onto an optical information recording medium, and to an optical pickup apparatus equipped with the objective lens.

2. Description of Related Art

Conventionally, an optical pickup apparatus (information recording and reproducing apparatus) has been used as an apparatus to perform the recording of information onto an optical information recording medium and the reproducing of the information recorded on an optical information recording medium. The optical pickup apparatus condenses a light emitted from a semiconductor laser light source onto the information recording surface of an optical information recording medium with an objective lens (optical lens) to perform the recording and the reproducing of information.

Moreover, in recent years, the following has been performed. That is, the trials of miniaturizing the diameter of a light beam spot, that is to say, the trials of narrowing down a beam spot sufficiently, with an objective lens so as to enable the recording and the reproducing of information with a light in a high-density recording state in order to enlarge the capacity of an optical information recording medium. Because the diameter of a beam spot is in inverse proportion to the numerical aperture (NA) of an objective lens, the enlargement of the NA of the objective lens has progressed, and an optical pickup apparatus has been recently developed that condenses a light flux of the wavelength in the range from 380 nm to 420 nm onto an optical information recording medium (called as a Blu-Ray Disc) with an objective lens having a numerical aperture on the side of a light source within a range from 0.8 to 0.9.

Moreover, it is insufficient for the optical pickup apparatus to be able to perform the recording and/or the reproducing of just one kind of optical information recording medium, and it is required for the optical pickup apparatus to deal with optical information recording media, such as a conventional compact disk (CD) (for the wavelength of about 780 nm, and for an NA of 0.45) and a digital versatile disk (DVD) (for the wavelength of about 650 nm, and for an NA of 0.6).

Now, devices for increasing the transmittance of optical components of an optical pickup apparatus have been performed to the optical components in order to use a light flux emitted from a light source efficiently. For example, an antireflective film has been formed on an optical surface of an objective lens or the like to suppress the quantity of lights reflected from the optical surface by the use of the interference of lights.

For example, a technique disclosed in Japanese Patent Application No. 2007-127954 forms one to three layers of antireflective films on the light source side surface of an objective lens used for a Blu-ray dedicated optical pickup apparatus having a numerical aperture (NA) of 0.85 on the light source side, and thereby suppresses the quantity of reflected lights to increase the transmittance of the objective lens.

However, when the antireflective films are formed on an objective lens used for a compatible optical pickup apparatus which can read and/or write information with a plurality of wavelengths, it has been difficult for the technique disclosed in Japanese Patent Application No. 2007-127954 to realize anti-reflection to each of the incident light fluxes having different wavelengths.

Although brief description of the above technique is given here, Japanese Patent Application No. 2007-127954 is not yet a laid-open publication at the time of the filing of the present application. Further, the inventor and the assignee of Japanese Patent Application No. 2007-127954 are the same as those of the present application. Thus, note that the inventor does not regard Japanese Patent Application No. 2007-127954 as a prior art of the present application.

On the other hand, it is known that the larger the incident angle of a light is, the more the wavelength dependency of the reflectance of the light shifts toward shorter wavelengths in the anti-reflection coat. Moreover, the more the light enters outer circumferential part of an objective lens from the central part thereof, the larger the incident angle of a light is. Consequently, in the conventional objective lens, the wavelength dependency of the reflectance of a light in a circumferential part shifts toward a shorter wavelength more than that of a light in the central part. As a result, the wavelength at which the reflectance of the light entering the circumferential part becomes the local minimum is shorter than that at which the reflectance of the light entering the central part becomes the local minimum. Consequently, in an objective lens provided with a conventional anti-reflection coat, the reflectance of a laser light has been low in the central part of the objective lens, but the reflectance of the laser light has been high in the circumferential part of the objective lens. Consequently, the transmitted light quantity in the circumferential part has become relatively smaller than that in the central part. As a result, the objective lens has had the problems of the deterioration of the spectral intensity of the transmitted lights of the whole lens, the enlargement of the diameter of a beam spot caused by the lowering of the converging performance of a light, the lowering of the light quantity of a beam, and the like.

Because the curvature of the lens surface of an objective lens having a high NA is large, the incident angle of a light in the circumferential part of the lens is very large. Consequently, the degree of the lowering of the quantity of a light transmitting the circumferential part of the objective lens becomes very large, and the enlargement of a spot diameter cannot be suppressed despite the use of the objective lens having the high NA. The situation like this is an obstacle to the enlargement of the capacity of an optical recording medium.

Japanese Patent Application Laid-Open Publication No. 2005-31361 discloses an objective lens securing a good balance between the miniaturization of the diameter of a spot and a transmitted light quantity by forming a specific antireflective film to set a local minimum reflected wavelength of an anti-reflection coat onto the longer wavelength side than the wavelengths within the range from 380 nm to 420 nm which are in use.

In order to obtain this sort of the objective lens, it is necessary to set the wavelength band in which the anti-reflection coat works to be wide. As a result, a maker is obliged to accept the enlargement of the number of the layers of the antireflective film, the thickness of each layer, and the total film thickness. However, the enlargement of the number of the layers, the thickness of each layer, and the total film thickness causes the problems of the lowering of the environment resistance to a high temperature environment and a high humidity environment, and of the lowering of the light resistance to prolonged light irradiation. However, Japanese Patent Application Laid-Open Publication No. 2005-31361 does not consider the balance between the transmitted light quantity of the objective lens, and the environment resistance and the light resistance. Thus the measures of Japanese Patent Application Laid-Open Publication No. 2005-31361 are insufficient.

Moreover, it became clear as a result of a further examination that the film thickness of an antireflective film decreased as the incident angle of a light into a lens enlarged, when the antireflective film was formed on the surface of the lens by the vacuum evaporation method. The optical film thickness at an incident angle θ was within a range from about D cos(3/4θ) nm to about D cos(8/9θ) nm to an optical film thickness D nm at an incident angle of 0°. It was also found that, because an evaporation source was placed at a position offset from the center of a dome on which the lens was set and the dome on which the lens was set had an arbitrary angle in a general evaporator, the optical film thickness was led to have a certain measure of distribution as the incident angle of the evaporation material from the evaporation source varied according to the direction and the position of the lens surface set on the dome. Consequently, also a problem became clear that, as the numerical aperture on the light source side became larger, the difference of the degrees of decreases of the film thicknesses became larger, and that the reflectance at a circumferential part of a lens became higher, which made the transmittance of the circumferential part fell further.

SUMMARY OF THE INVENTION

Accordingly, a main object of the present invention is to provide an objective lens having the compatibility with the lights in a plurality of wavelength regions, and having environment resistance, and light resistance with the transmittance of each wavelength being secured to be high, and an optical pickup apparatus using the objective lens.

According to an aspect of the present invention, there is provided an objective lens used for an optical pickup apparatus to perform writing and/or reading of an optical information recording medium by light from a light source, comprising an antireflective film on a surface of a light source side, wherein a light flux of a plurality of wavelengths including a wavelength λ1 which is within a range of 380 nm≦λ1≦420 nm and a wavelength λ2 which is within a range of 630 nm≦λ2≦810 nm, is condensed on the optical information recording medium by the objective lens, a numerical aperture on the light source side with respect to the wavelength λ1 is within a range from 0.8 to 0.9, the numerical aperture on the light source side with respect to the wavelength λ2 is 0.7 or less, and a band of the antireflective film is within a range from 700 nm to 800 nm in a state where a reflectance of a light flux perpendicularly entering a central portion of the surface in a wavelength region from 400 nm to 1200 nm is 3.0% or less.

According to another aspect of the present invention, there is provided the optical pickup apparatus comprising the objective lens, wherein the objective lens is formed by a plastic molding.

According to the present invention, it becomes possible to provide an objective lens having the environment resistance and the light resistance with the transmittance of the light of each wavelength being secured to be high, and an optical pickup apparatus using the objective lens.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DETAILED DESCRIPTION OF THE PREFERRED EMBODIMENTS

Next, a preferable embodiment of the present invention will be described with reference to the attached drawings.

In the present embodiment, (A) an optical pickup apparatus according to the preferable embodiment of the present invention is described first, and after that, (B) an objective lens is described.

(A) Optical Pickup Apparatus

Figure 1:
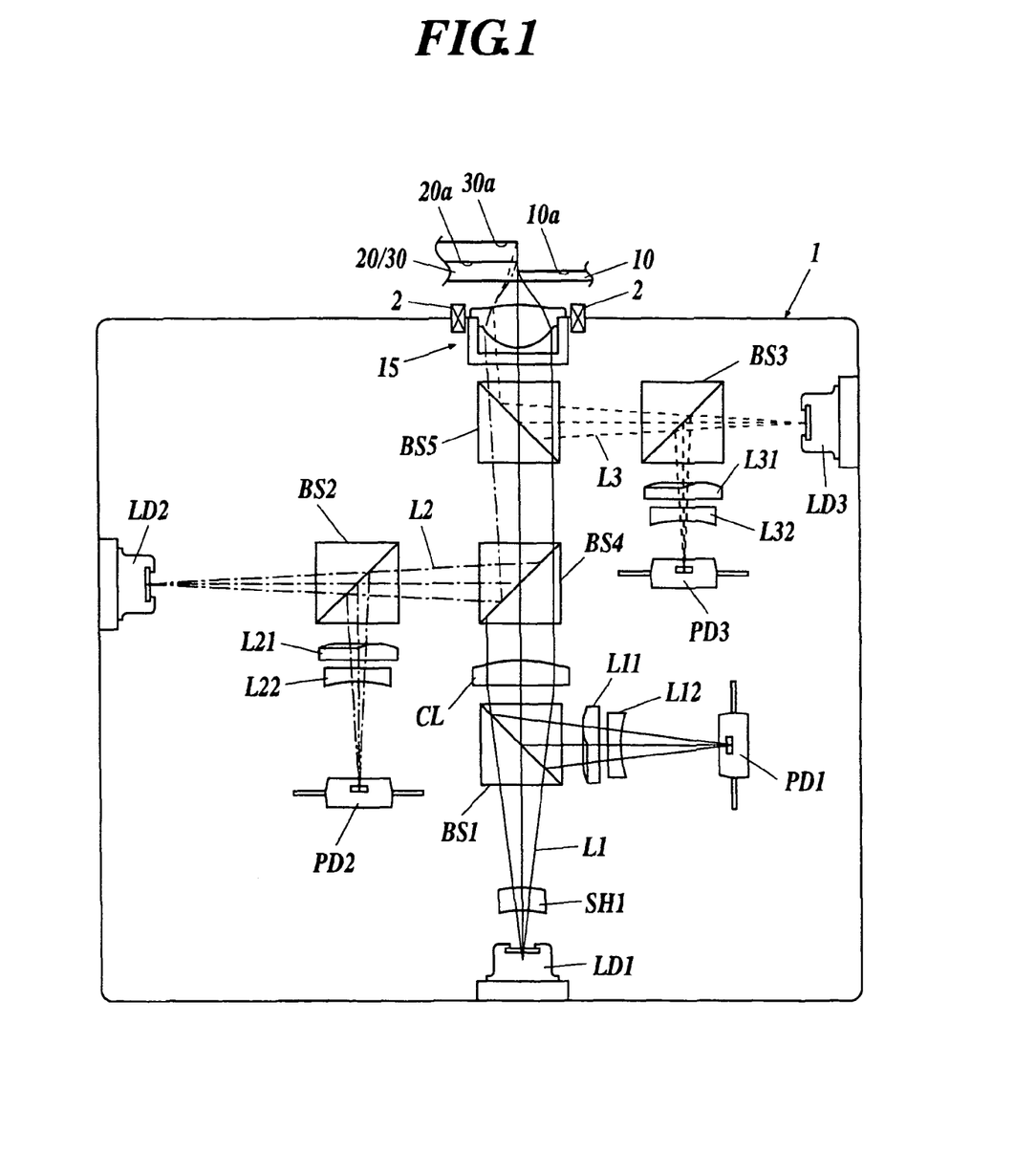
FIG. 1 is a drawing showing the schematic configuration of an optical pickup apparatus to be used for a preferable embodiment of the present invention.

As shown in FIG. 1, the optical pickup apparatus 1 is provided with three kinds of semiconductor laser oscillators LD1, LD2, and LD3 as light sources.

The semiconductor laser oscillator LD1 emits a light flux L1 of a specific wavelength (for example 405 nm) among the wavelengths in a range from 380 nm to 420 nm for a Blu-Ray disc (BD) 10. The semiconductor laser oscillator LD2 emits a light flux L2 of a specific wavelength (for example 655 nm) among the wavelengths in a range from 630 nm to 670 nm for a DVD 20. The semiconductor laser oscillator LD3 emits a light flux L3 of a specific wavelength (for example 780 nm) among the wavelengths in a range from 760 nm to 810 nm for a CD 30.

A shaver SH1, a splitter BS1, a collimator CL, splitters BS4 and BS5, and an objective lens 15 are sequentially arranged in the optical axis direction of a blue-violet light emitted from the semiconductor laser oscillator LD1 from the lower part to the upper part in FIG. 1. The BD 10, the DVD 20, and the CD 30 are placed at positions opposed to the objective lens 15 as optical information recording media.

A cylindrical lens L11, a concave lens L12, and a photo-detector PD1 are sequentially arranged on the right of the splitter BS1 in FIG. 1.

Splitters BS2 and BS4 are sequentially arranged in the optical axis direction of a red light emitted from the semiconductor laser oscillator LD2 from the left to the right in FIG. 1.

A cylindrical lens L21, a concave lens L22, and a photodetector PD2 are sequentially arranged in the lower part of the splitter BS2 in FIG. 1.

Splitters BS3 and BS5 are sequentially arranged in the optical axis direction of the light emitted from the semiconductor laser oscillator LD3 from the right to the left in FIG. 1.

A cylindrical lens L31, a concave lens L32, and a photodetector PD3 are sequentially arranged in the lower part of the splitter BS3 in FIG. 1.

The objective lens 15 is placed to be opposed to the BD 10, the DVD 20, or the CD 30, and condenses the lights emitted from each of the semiconductor laser oscillators LD1, LD2, and LD3 to the BD 10, the DVD 20, or the CD 30. The BD 10, the DVD 20, and the CD 30 include recording surfaces 10a, 20a, and 30a, respectively, and are configured to cover the surface of each of the recording surfaces 10a, 20a, and 30a with a transparent protecting board.

The objective lens 15 is equipped with a two-dimensional actuator 2, and the objective lens 15 can move freely in the vertical direction (or in the horizontal direction) by the operation of the two-dimensional actuator 2.

Next, the operation of the optical pickup apparatus 1 is described.

Because the optical pickup apparatus 1 of the present embodiment operates differently according to the kind of an optical information recording medium, the details of the operation modes for the BD 10, the DVD 20, and the CD 30 will be described, respectively, in the following.

First, the operation of the optical pickup apparatus 1 for the BD 10 is described.

The semiconductor laser oscillator LD1 emits the light flux L1 at the time of a recording and/or reproducing operation of information against the BD 10 (at the time of performing the writing and/or the reading of the BD 10). The light flux L1 is formed by being transmitted by the shaver SH1, and is transmitted by the splitter BS1. Then, the light flux L1 is made to be a parallel light by the collimator CL, following which the parallel light is transmitted by each of the splitters BS4 and BS5, the objective lens 15, and the transparent protecting board of the BD 10. The light flux L1 thus forms a spot condensed on the recording surface 10a of the BD 10.

The light flux L1 formed as the condensed spot is modulated on the recording surface 10a of the BD 10 by information pits, and is reflected by the recording surface 10a. The reflected light flux L1 is transmitted by the transparent protecting board of the BD 10, the objective lens 15, the splitter BS5, and the collimator CL, and is reflected by the splitter BS1. After that, the reflected light flux L1 is transmitted by the cylindrical lens L11, and is given astigmatism. After that, the light flux L1 is transmitted by the concave lens L12 to be received by the photodetector PD1.

The operation like this is repeatedly performed since then, and the recording operation of information to the BD 10 and/or the reproducing operation of the information recorded on the BD 10 is completed.

Next, the operation of optical pickup apparatus 1 for the DVD 20 is described.

The semiconductor laser oscillator LD2 emits the light flux L2 at the time of a recording and/or reproducing operation of information against the DVD 20 (at the time of performing the writing and/or the reading of the DVD 20). The light flux L2 is transmitted by the splitter BS2, and is reflected by the splitter BS4. Then, the reflected light flux L2 is transmitted by the splitter BS5, the objective lens 15, and the transparent protecting board of the DVD 20, and forms a spot condensed on the recording surface 20a of the DVD 20.

The light flux L2 formed as the condensed spot is modulated on the recording surface 20a of the DVD 20 by information pits, and is reflected by the recording surface 20a. The reflected light flux L2 is transmitted by the transparent protecting board of the DVD 20, the objective lens 15, and the splitter BS5, and is reflected by each of the splitters BS4 and BS2. After that, the reflected light flux L2 is transmitted by the cylindrical lens L21, and is given astigmatism. After that, the light flux L2 is transmitted by the concave lens L22 to be received by the photodetector PD2.

The operation like this is repeatedly performed since then, and the recording operation of information to the DVD 20 and/or the reproducing operation of the information recorded on the DVD 20 is completed.

Last, the operation of optical pickup apparatus 1 for the CD 30 is described.

The semiconductor laser oscillator LD3 emits the light flux L3 at the time of a recording and/or reproducing operation of information against the CD 30 (at the time of performing the writing and/or the reading of the CD 30). The light flux L3 is transmitted by the splitter BS3, and is reflected by the splitter BS5. Then, the reflected light flux L3 is transmitted by the objective lens 15 and the transparent protecting board of the CD 30, and forms a spot condensed on the recording surface 30a of the CD 30.

The light flux L3 formed as the condensed spot is modulated on the recording surface 30a of the CD 30 by information pits, and is reflected by the recording surface 30a. The reflected light flux L3 is transmitted by the transparent protecting board of the CD 30 and the objective lens 15, and is reflected by each of the splitters BS5 and BS3. After that, the reflected light flux L3 is transmitted by the cylindrical lens L31, and is given astigmatism. After that, the light flux L3 is transmitted by the concave lens L32 to be received by the photodetector PD3.

The operation like this is repeatedly performed since then, and the recording operation of information to the CD 30 and/or the reproducing operation of the information recorded on the CD 30 is completed.

Incidentally, the optical pickup apparatus 1 is adapted to detect the changes of light quantities caused by the changes of the shapes of spots or the changes of positions of spots on the respective photodetectors PD1, PD2, and PD3 to perform in-focus detection or track detection at the time of the recording and/or the reproducing operation of information to the BD 10, the DVD 20, or the CD 30. Then, the optical pickup apparatus 1 like this moves the objective lens 15 so that the lights from the semiconductor laser oscillators LD1, LD2, and LD3 gay form images on the recording surfaces 10a, 20a, and 30a of the BD 10, the DVD 20, and the CD 30, respectively, with the two-dimensional actuator 2, and moves the objective lens 15 so that the lights from the semiconductor laser oscillators LD1, LD2, and LD3 may form images on the predetermined tracks of the recording surfaces 10a, 20a, and 30a, respectively, on the basis of the detection results of the photodetectors PD1, PD2, and PD3.

Moreover, when recording and/or reproducing is performed on the BD 10 with the light flux L1, the optical pickup apparatus 1 is adapted to have an image side numerical aperture (NA) of the objective lens 15 in a range from 0.8 to 0.9. On the other hand, when recording and/or reproducing is performed on the DVD 20 and the CD 30 with the light fluxes L2 and L3, respectively, the optical pickup apparatus 1 is adapted to have an image side numerical aperture (NA) of the objective lens 15 to be equal to 0.7 or less. Preferably, when the recording and/or the reproducing is performed to the DVD 20 with the light flux L2, the image side numerical aperture of the objective lens 15 is within a range from 0.60 to 0.70, and when the recording and/or the reproducing is performed to the CD 30 with the light flux L3, the image side numerical aperture of the objective lens 15 is within a range from 0.42 to 0.52.

(B) Objective Lens

Figure 2:
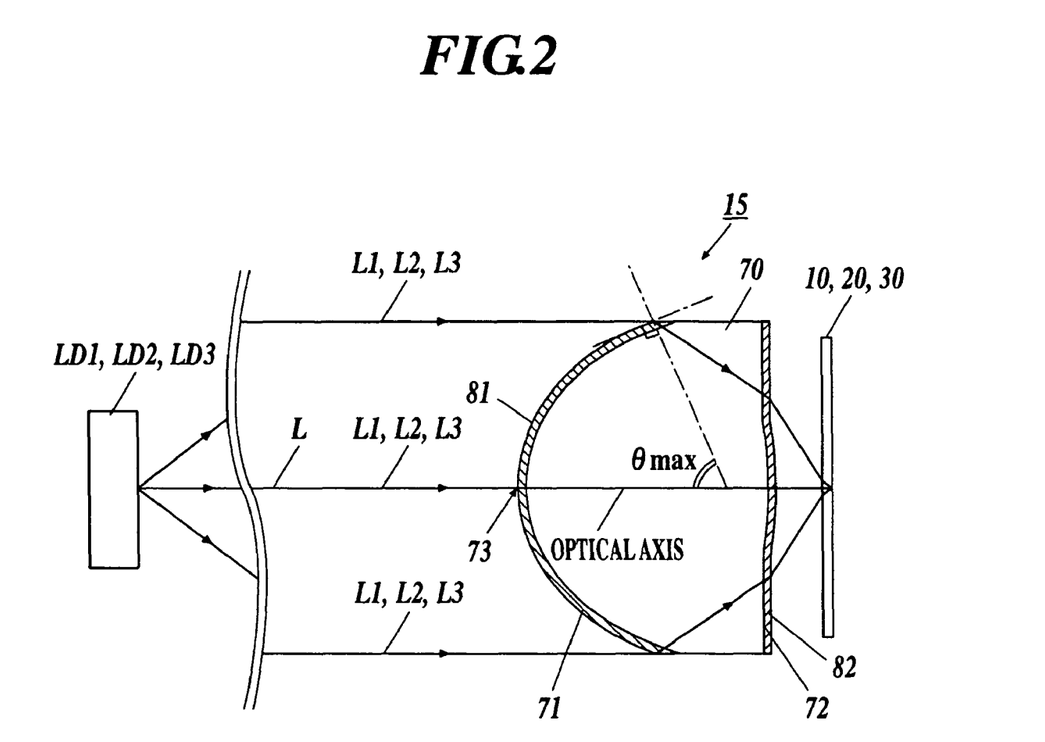
FIG. 2 is a drawing showing the schematic configuration of an objective lens to be used for the preferable embodiment of the present invention.

As shown in FIG. 2, the objective lens 15 includes the lens main body 70 formed by plastic molding, and is configured to form antireflective films 81 and 82 on the surfaces of the lens main body 70.

The lens main body 70 is made of a thermoplastic resin, and is preferably made of a cyclic olefin series copolymer expressed by a general chemical formula (1).

(1)

In the general chemical formula (1), "$R^1$" denotes one kind or two or more kinds of divalent groups selected from a group of hydrocarbon radicals having carbon numbers in a range from 2 to 20; "$R^2$" denotes one kind or two or more kinds of monovalent groups selected from a group composed of hydrogen and hydrocarbon radicals having carbon numbers in a range from 1 to 5; and "x" and "y" denote a copolymerization ratio and are real numbers that makes x/y be 5/95 or more and 95/5 or less.

In the general chemical formula (1), preferably, "$R^1$" is one kind or two or more kinds of divalent groups selected from the group of hydrocarbon radicals having the carbon numbers in a range from 2 to 12; more preferably, is the divalent groups expressed by a general chemical formula (2); and most preferably, divalent groups expressed by the general chemical formula (2) in which p is 0 or 1. Only one kind of structure may be used as the structure of "$R^1$," or two or more kinds of structures may be used together.

(2)

In the general chemical formula (2), "p" denotes an integer within a range from 0 to 2.

Moreover, in the general chemical formula (1), hydrogen, the methyl group, the ethyl group, the n-propyl group, the I-probyl group, the n-butyl group, the 2-methyl probyl group, and the like can be cited as the examples of "$R^2$." Preferably, "$R^2$" is hydrogen and/or —$CH_3$, and most preferably "$R^2$" is hydrogen.

Moreover, the type of the copolymerization of forming the lens main body 70 is not particularly limited, but publicly known various copolymerization types, such as a random copolymer, a block copolymer, and alternating copolymerization can be applied. But, the random copolymer is prefer-able. APEL available from Mitsui Chemicals, Inc. can be cited as a commercially available resin capable of forming the lens main body 70.

The lens main body 70 includes an optical surface 71 (hereinafter referred to as "S1 surface 71"), into which the light fluxes L1, L2, and L3 emitted from the semiconductor laser oscillators LD1, LD2, and LD3, respectively, enter, and an optical surface 72 (hereinafter referred to as "S2 surface 72"), into which the light fluxes L1, L2, and L3 are transmitted by the objective lens 15 to outgo toward the BD 10, the DVD 20, and the CD 30, respectively.

The S1 surface 71 is a surface placed on the side of the semiconductor laser oscillators LD1, LD2, and LD3 (light source side), and the S2 surface 72 is a surface placed on the side of the BD 10, the DVD 20, and the CD 30 (image side).

The antireflective film 81 is formed on the S1 surface 71, and the total film thickness of the antireflective film 81 is within a range from 490 nm to 550 nm. The antireflective film 81 has a laminated structure in which a plurality of layers is laminated; preferably, the number of the layers is an odd number; and more preferably, the number of the layers is 9. At least two layers of the layers which configure the antireflective film 81 are made of a low refraction index material and a high refraction index material, respectively. Preferably, the layer made of the low refraction index material is formed directly on the lens main body 70, and the layer made of the high refraction index material is formed on the layer made of the low refraction index material. When the number of the layers of the antireflective film 81 is three or more, then, preferably, the layer made of the low refraction index material is formed directly on the lens main body 70, and the layer made of the high refraction index material and the layer made of the low refraction index material are alternately laminated on the first layer.

The "low refraction index material" is a material having a refraction index $n_L$ to the light of the wavelength of 500 nm within a range of $1.3 \leq n_L < 1.5$, and the "high refraction index material" is a material having a refraction index $n_H$ to the light of the wavelength of 500 nm within a range of $1.8 \leq n_H < 2.1$. As the low refraction index material, there are, for example, silicon oxide, magnesium fluoride, aluminum fluoride, and cryolite, and it is preferable to use a material including silicon oxide ($SiO_2$) as the principal component thereof. As the high refraction index material, there are, for example, cerium oxide, titanium oxide, tantalum oxide, zirconium oxide, aluminum oxide, silicon nitride, and oxygen-containing silicon nitride, and it is preferable to use a material including zirconium oxide ($ZrO_2$) as the principal component thereof.

Incidentally, each of the foregoing layers may be formed as a layer including a single component using one kind of these materials, or may be formed as a layer including a plurality of components using a plurality of kinds of these materials. Moreover, as the cases of using a plurality of kinds of these materials, there are a case of using a mixture as an evaporation material, a case of using separated materials as evaporation materials at the same time, and the like. It is preferable to form the antireflective film 81 like this in a laminated state by the technique disclosed in, for example, Japanese Patent Application Laid-Open Publication No. 10-160906, but the antireflective film 81 may be formed as a film by conventionally well known film formation methods, such as the vacuum evaporation method, the sputtering method, the chemical vapor deposition (CVD) method, and the atmospheric pressure plasma method (Japanese Patent Application Laid-Open Publications No. 2001-100008 and No. 2000-147209).

In the antireflective film 81, the thickness $T_{L-MAX}$ of the thickest layer in the layers formed of the low refraction index materials is within a range of 100 nm$\leq T_{L-MAX}<$190 nm, and the thickness $T_{H-MAX}$ of the thickest layer in the layers formed of the high refraction index materials is within a range of 65 nm$\leq T_{H-MAX}<$90 nm.

The antireflective film 82 is formed on the S2 surface 72. The antireflective film 82 has the same configuration as that of the antireflective film 81, and preferably the number of the layers of the antireflective film 82 is 5 layers or 7 layers. Although both of the antireflective films 81 and 82 are provided in the present embodiment, the antireflective film 82 may not be formed.

The aforesaid objective lens 15 has a property as the spectral characteristic of the objective lens 15, in which the band (wavelength width) is within the range from 700 nm to 800 nm, in a state where the reflectance of a light flux entering perpendicular to the central portion 73 of the S1 surface 71 in a wavelength region from 400 nm to 1200 nm is 3.0% or less, since the antireflective film 81 is formed on the Si surface 71. Preferably the mean reflectance of the light fluxes in the wavelength region of from 1100 nm to 1200 nm is within a range from 2.0% to 3.5%.

That "the band (wavelength width) is within the range from 700 nm to 800 nm, in a state where the reflectance in a wavelength region from 400 nm to 1200 nm is 3% or less" in the embodiment of the present invention means that the width of the band in which the reflectance is 3.0% or less to the wavelength in a wavelength range from 400 nm to 1200 nm becomes a width from 700 nm or more to 800 nm or less continuously. Consequently, there is a band in which the reflectance is 3.0% or more to a part of the wavelengths within the range from 400 nm to 1200 nm.

Furthermore, in the objective lens 15, the maximum incident and outgoing angle (the maximum visual angle) θ max of the light flux L1 on the S1 surface 71 meets the condition of 60°$\leq$θ max$\leq$72°. Here, the "maximum incident and outgoing angle θ max" is an angle by which the normal line at an intersection point of the light flux L1 with the S1 surface 71 at an end of the effective diameter of the S1 surface 71 intersects with the optical axis (see FIG. 2).

According to the aforesaid embodiment, since the antireflective film 81 having a certain spectral characteristic is formed on the S1 surface 71 of the objective lens 15, the transmittance of each of the wavelengths in the range from 380 nm to 420 nm, the range from 630 nm to 670 nm, and the range from 760 nm to 810 nm to the light fluxes L1, L2, and L3, respectively, can be secured to be high, and the environment resistance to a high temperature environment and a high humidity environment and the light resistance to the light fluxes L1, L2, and L3 can be improved (see the following examples).

Incidentally, a diffraction structure may be or may not be formed on the lens main body 70 of the objective lens 15. Moreover, the number of the layers of the antireflective film 81 is not particularly limited, but the number of the layers is preferably within a range from 7 to 11. The number of the layers is further preferably an odd number, and is especially preferablely 9 as described above.

When the number of the layers of the antireflective film 81 is less than 7, then it is necessary to make any one of the layers extremely thick or thin in order to achieve the spectral characteristic mentioned above. When any one of the layers of the antireflective film 81 is made to be extremely thick, then there is the possibility of lowing of the environment resistance to a high temperature environment and a high humidity environment and light resistance. On the other hand, when any one of the layers of the antireflective film 81 is made to be extremely thin, then there is the possibility that the reproducibility of the reflection characteristic deteriorates and the productivity lowers. Consequently, the number of the layers of the antireflective film 81 is preferably 7 or more.

When the number of the layers of the antireflective film 81 is 8 or 10 (even number layers), then it is necessary to form the outermost layer of a low refraction index material. Consequently, the layer contacting with the lens main body 70 directly becomes the layer made of a high refraction index material. When the layer contacting with the lens main body 70 directly is made of a high refraction index material, then there is the possibility of the lowering of the light resistance to the light flux L1 of a wavelength in the range from 380 nm to 420 nm. Accordingly, it is preferable that the number of the layers of the antireflective film 81 is an odd number, such as 7, 9, and 11.

When the number of the layers of the antireflective film 81 is 12 or more, then it is necessary to make any one of the layers extremely thin in order to achieve the spectral characteristic mentioned above. When any one of the layers of the antireflective film 81 is made to be extremely thin, then there is the possibility that the reproducibility of the reflection characteristic deteriorates and the productivity lowers, and further, there is the possibility that the environment resistance lowers owing to the increase of the number of the layers and the cost increases. Accordingly, it is preferable that the number of the layers of the antireflective film 81 is 11 or less.

[Embodiment 1]

(1) Production of Samples and Their Properties

As a base material, APEL made by Mitsui Chemicals, Inc. was molded to produce ten molded articles having the following lens characteristics (no diffraction structures were formed in these molded articles).

Refraction index at the central part to the light of the wavelength of 500 nm: 1.55

Numerical aperture NA (for BD) on the light source side to the light of the wavelength of 405 nm: 0.85

Numerical aperture NA (for DVD) on the light source side of the light of the wavelength of 655 nm: 0.6

Numerical aperture NA (for CD) on the light source side of the light of the wavelength of 780 nm: 0.45

Maximum visual angle (for BD) of the light of the wavelength of 405 nm: 68°

Maximum visual angle (for DVD) of the light of the wavelength of 655 nm: 55°

Maximum visual angle (for CD) of the light of the wavelength of 780 nm: 45°

After that, antireflective films each composed of a plurality of layers shown in Tables 1, 1' and Tables 2, 2' were formed on the molded articles. These ten samples were set as "Examples 1-5, Comparative Examples 1-5" according to the film types of the antireflective films.

[Tables 1, 1']

TABLE 1

| | ANTIREFLECTIVE FILM (S1 SURFACE) | | | | | |
|---|---|---|---|---|---|---|
| | EXAMPLE 1 | | EXAMPLE 2 | | EXAMPLE 3 | |
| LAYER NO. | MATERIAL | FILM THICKNESS AT CENTRAL PART (nm) | MATERIAL | FILM THICKNESS AT CENTRAL PART (nm) | MATERIAL | FILM THICKNESS AT CENTRAL PART (nm) |
| 9 | L5 | 114 | L5 | 107 | L5 | 107 |
| 8 | $ZrO_2$ | 38 | $ZrO_2$ | 46 | $ZrO_2$ | 35 |
| 7 | $SiO_2$ | 26 | $SiO_2$ | 16 | $SiO_2$ | 19 |
| 6 | $ZrO_2$ | 70 | $ZrO_2$ | 80 | $ZrO_2$ | 85 |
| 5 | L5 | 27 | L5 | 29 | L5 | 17 |
| 4 | $ZrO_2$ | 39 | $ZrO_2$ | 33 | $ZrO_2$ | 37 |
| 3 | L5 | 56 | L5 | 60 | L5 | 48 |
| 2 | $ZrO_2$ | 12 | $ZrO_2$ | 11 | $ZrO_2$ | 12 |
| 1 | $SiO_2$ | 120 | $SiO_2$ | 140 | $SiO_2$ | 180 |
| | BASE MATERIAL | | BASE MATERIAL | | BASE MATERIAL | |

TABLE 1'

| | ANTIREFLECTIVE FILM (S1 SURFACE) | | | | ANTIREFLECTIVE FILM (S2 SURFACE) | |
|---|---|---|---|---|---|---|
| | EXAMPLE 4 | | EXAMPLE 5 | | EXAMPLES 1-5 | |
| LAYER NO. | MATERIAL | FILM THICKNESS AT CENTRAL PART (nm) | MATERIAL | FILM THICKNESS AT CENTRAL PART (nm) | MATERIAL | FILM THICKNESS AT CENTRAL PART (nm) |
| 9 | L5 | 121 | L5 | 105 | — | — |
| 8 | $ZrO_2$ | 42 | $ZrO_2$ | 44 | — | — |
| 7 | $SiO_2$ | 30 | $SiO_2$ | 31 | L5 | 97.1 |
| 6 | $ZrO_2$ | 65 | $ZrO_2$ | 69 | $ZrO_2$ | 58.5 |
| 5 | L5 | 40 | L5 | 48 | $SiO_2$ | 14.9 |
| 4 | $ZrO_2$ | 33 | $ZrO_2$ | 30 | $ZrO_2$ | 56.9 |
| 3 | L5 | 77 | L5 | 99 | L5 | 47.1 |
| 2 | $ZrO_2$ | 9 | $ZrO_2$ | 7 | $ZrO_2$ | 15.3 |
| 1 | $SiO_2$ | 100 | $SiO_2$ | 100 | $SiO_2$ | 112 |
| | BASE MATERIAL | | BASE MATERIAL | | BASE MATERIAL | |

[Tables 2, 2']

TABLE 2

| | ANTIREFLECTIVE FILM (S1 SURFACE) | | | | | |
|---|---|---|---|---|---|---|
| | COMPARATIVE EXAMPLE 1 | | COMPARATIVE EXAMPLE 2 | | COMPARATIVE EXAMPLE 3 | |
| LAYER NO. | MATERIAL | FILM THICKNESS AT CENTRAL PART (nm) | MATERIAL | FILM THICKNESS AT CENTRAL PART (nm) | MATERIAL | FILM THICKNESS AT CENTRAL PART (nm) |
| 11 | — | — | — | — | L5 | 107 |
| 10 | — | — | — | — | $ZrO_2$ | 49 |
| 9 | — | — | — | — | $SiO_2$ | 10 |
| 8 | — | — | L5 | 116 | $ZrO_2$ | 80 |
| 7 | L5 | 122 | $ZrO_2$ | 42 | L5 | 10 |
| 6 | $ZrO_2$ | 44 | $SiO_2$ | 16 | $ZrO_2$ | 9 |
| 5 | $SiO_2$ | 34 | $ZrO_2$ | 112 | L5 | 15 |
| 4 | $ZrO_2$ | 60 | L5 | 21 | $ZrO_2$ | 21 |
| 3 | L5 | 49 | $ZrO_2$ | 43 | L5 | 39 |
| 2 | $ZrO_2$ | 24 | L5 | 48 | $ZrO_2$ | 10 |
| 1 | $SiO_2$ | 115 | $ZrO_2$ | 15 | $SiO_2$ | 140 |
| | BASE MATERIAL | | BASE MATERIAL | | BASE MATERIAL | |

TABLE 2'

| | ANTIREFLECTIVE FILM (S1 SURFACE) | | | | ANTIREFLECTIVE FILM (S2 SURFACE) | |
| --- | --- | --- | --- | --- | --- | --- |
| | COMPARATIVE EXAMPLE 4 | | COMPARATIVE EXAMPLE 5 | | COMPARATIVE EXAMPLES 1-5 | |
| LAYER NO. | MATERIAL | FILM THICKNESS AT CENTRAL PART (nm) | MATERIAL | FILM THICKNESS AT CENTRAL PART (nm) | MATERIAL | FILM THICKNESS AT CENTRAL PART (nm) |
| 11 | — | | — | | | |
| 10 | — | | — | | | — |
| 9 | L5 | 103 | L5 | 112 | | |
| 8 | $ZrO_2$ | 49 | $ZrO_2$ | 40 | | |
| 7 | $SiO_2$ | 7 | $SiO_2$ | 16 | | |
| 6 | $ZrO_2$ | 105 | $ZrO_2$ | 106 | | |
| 5 | L5 | 36 | L5 | 21 | | |
| 4 | $ZrO_2$ | 27 | $ZrO_2$ | 37 | | |
| 3 | L5 | 85 | L5 | 57 | | |
| 2 | $ZrO_2$ | 9 | $ZrO_2$ | 11 | | |
| 1 | $SiO_2$ | 61 | $SiO_2$ | 216 | | |
| | BASE MATERIAL | | BASE MATERIAL | | BASE MATERIAL | |

In Tables 1, 1' and Tables 2, 2', the layers having the "Layer No." of "1" are layers formed on the resin molded articles (base materials) directly. "L5" in the constituting materials of each layer is a low refraction index material, and is Substance L5 made by Merck Ltd.

(2) Characteristics of Samples (2.1) Measurement of Reflectances

Figure 3:
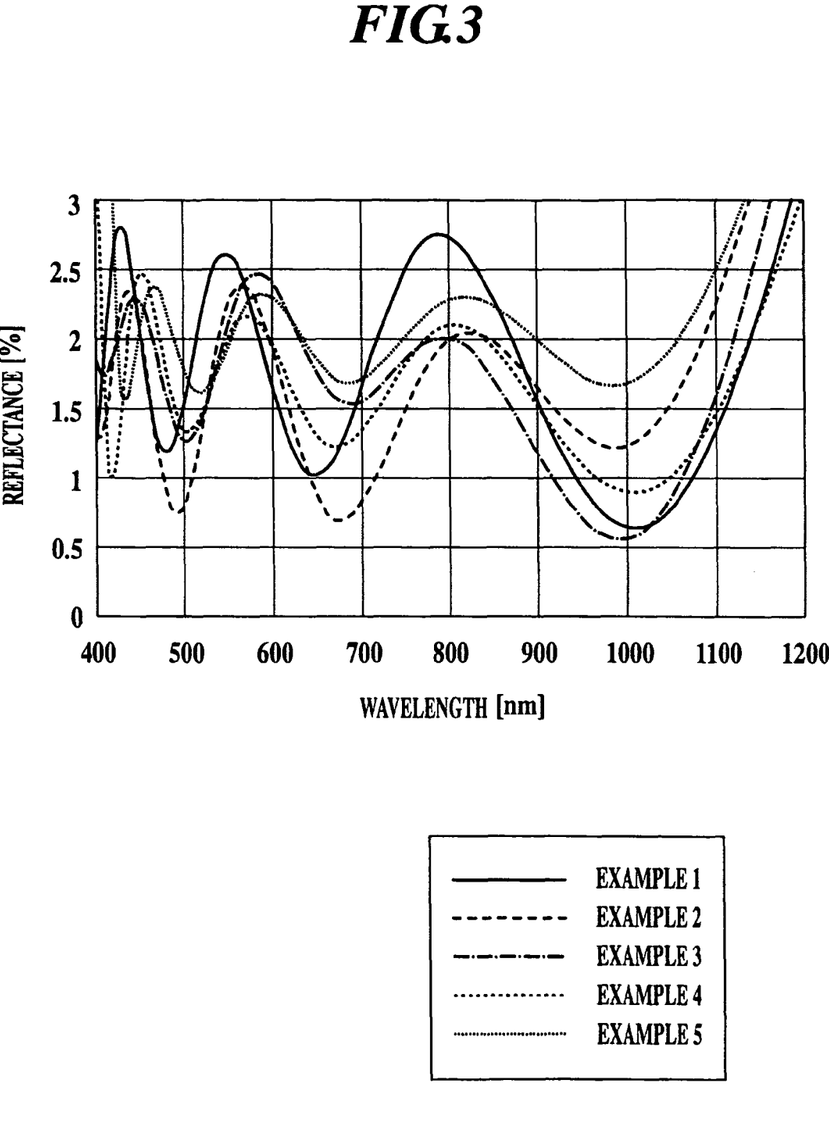
FIG. 3 is a schematic diagram showing relations between the wavelengths and the reflectances of samples according to preferable examples of the present invention (examples 1-5)
Figure 4:
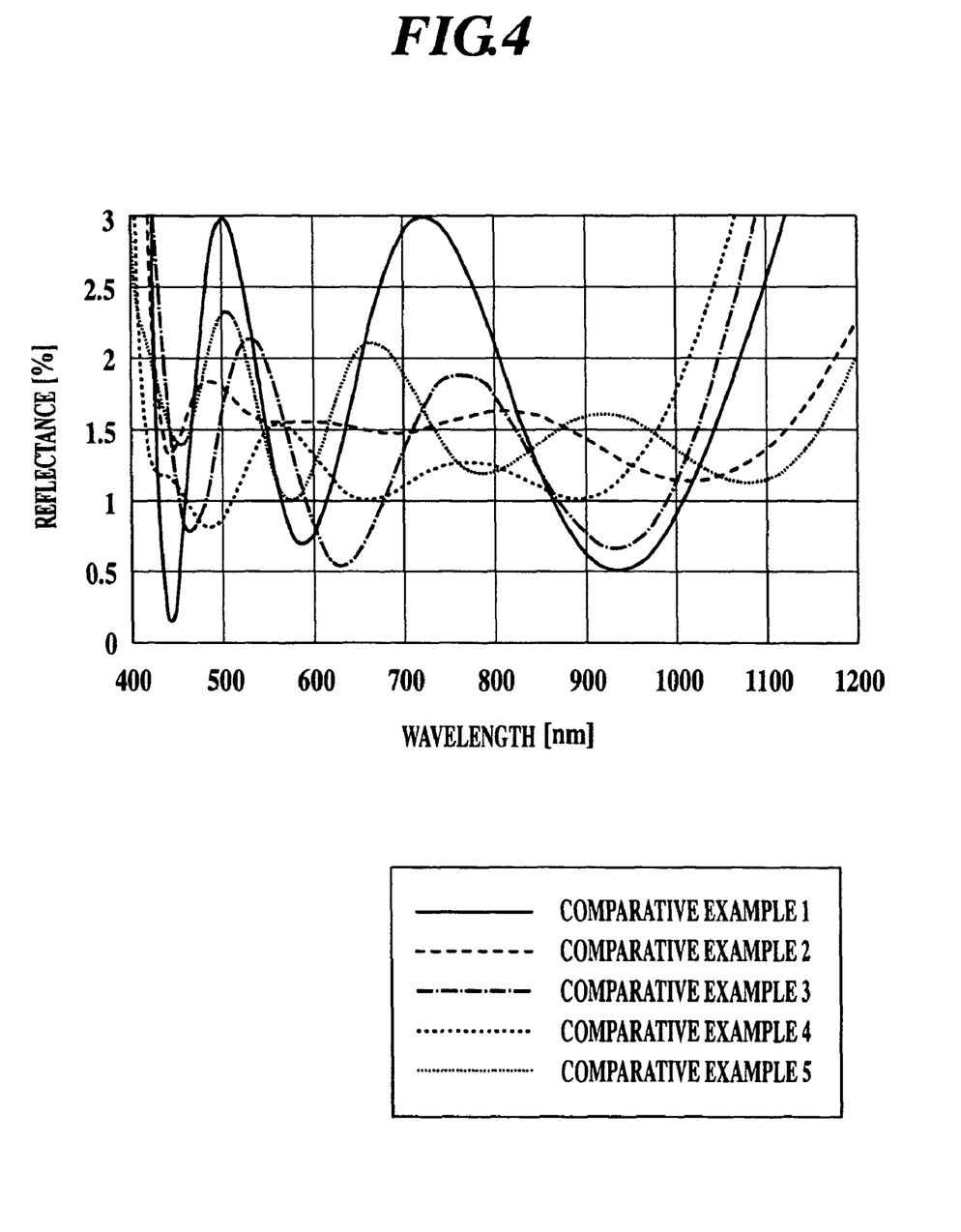
FIG. 4 is a schematic diagram showing relations between the wavelengths and the reflectances of samples according to comparative examples (comparative examples 1-5) to the preferable examples of the present invention.

The reflectances (%) of the lights having the wavelengths in the range from 400 nm to 1,200 nm of each sample of Examples 1-5 and Comparative examples 1-5 were measured. The measurement results are shown in FIGS. 3 and 4, and Table 3. In particular, in Table 3, bands (wavelength widths) in which the reflectances to the lights having the wavelength region from 400 nm to 1,200 nm are 3.0% or less, and mean reflectances (%) of the lights having the wavelength region from 1,100 nm to 1,200 nm are described.

(2.2) Measurement of Transmittances

Transmittances (%) of each sample of Examples 1-5 and Comparative Examples 1-5 to the lights having the wavelengths of 405 nm, 655 nm, and 780 nm were measured with Spectral Photometer U-4000 made by Hitachi Ltd. The measurement results are shown in Table 3'.

(2.3) Measurement of Pupil Transmittances

Transmittances (%) at the outermost circumference parts of the effective diameters of each sample of Examples 1-5 and Comparative Examples 1-5 to the lights having a wavelength of 405 nm were measured with a blue spot inspection machine. The measurement results are shown in Table 3'.

(2.4) Observation of Antireflective Films

The antireflective films of each sample of Examples 1-5 and Comparative Examples 1-5 were comprehensively observed on the basis of the contents of Tables 1, 1' and Tables 2, 2'. The observation results are shown in Table 3". In Table 3", "MAXIMUM THICKNESS OF L MATERIAL" indicates the thickness of the thickest layer among the layers made of the low refraction index materials that constitute the antireflective films (S1 surfaces), and "MAXIMUM THICKNESS OF H MATERIAL" indicates the thickness of the thickest layer among the layers made of the high refraction index materials that constitute the antireflective films (S1 surfaces).

[Tables 3, 3', 3"]

TABLE 3

| SAMPLE | BAND IN WHICH REFLECTANCE IS 3.0% OF LESS IN WAVELENGTH REGION FROM 400 nm TO 1200 nm (nm) | | MEAN REFLECTANCE IN WAVELENGTH REGION FROM 1100 nm TO 1200 nm (%) |
| --- | --- | --- | --- |
| EXAMPLE 1 | 789 | ○ | 2.25 |
| EXAMPLE 2 | 738 | ○ | 3.31 |
| EXAMPLE 3 | 762 | ○ | 2.76 |
| EXAMPLE 4 | 791 | ○ | 2.24 |
| EXAMPLE 5 | 713 | ○ | 3.35 |
| COMPARATIVE EXAMPLE 1 | 696 | X | 3.63 |
| COMPARATIVE EXAMPLE 2 | 800 OR MORE | X | 1.79 |
| COMPARATIVE EXAMPLE 3 | 661 | X | 4.76 |
| COMPARATIVE EXAMPLE 4 | 660 | X | 5.01 |
| COMPARATIVE EXAMPLE 5 | 800 OR MORE | X | 1.50 |

TABLE 3'

| | TRANSMITTANCE (%) | | | TRANSMITTANCE OF WAVELENGTH OF 405 nm ON OUTERMOST |
| --- | --- | --- | --- | --- |
| SAMPLE | 405 nm | 655 nm | 780 nm | CIRCUMFERENCE (%) |
| EXAMPLE 1 | 93.5 | 96.3 | 97.1 | 87.5 |
| EXAMPLE 2 | 93.7 | 96.4 | 97.0 | 87.2 |
| EXAMPLE 3 | 93.7 | 96.5 | 97.3 | 88.2 |
| EXAMPLE 4 | 93.7 | 96.6 | 97.3 | 88.4 |
| EXAMPLE 5 | 93.2 | 96.1 | 96.8 | 88.1 |
| COMPARATIVE EXAMPLE 1 | 92.8 | 95.8 | 97.3 | 83.5 |
| COMPARATIVE EXAMPLE 2 | 93.6 | 96.6 | 97.9 | 87.2 |
| COMPARATIVE EXAMPLE 3 | 93.3 | 96.0 | 96.7 | 83.3 |
| COMPARATIVE EXAMPLE 4 | 93.7 | 96.1 | 96.6 | 83.8 |
| COMPARATIVE EXAMPLE 5 | 93.8 | 96.8 | 97.6 | 94.8 |

TABLE 3"

| SAMPLE | ANTIREFLECTIVE FILM ||||
| --- | --- | --- | --- | --- |
| | NUMBER OF LAYERS | TOTAL FILM THICKNESS (nm) | MAXIMUM THICKNESS OF L MATERIAL (nm) | MAXIMUM THICKNESS OF H MATERIAL (nm) |
| EXAMPLE 1 | 9 | 500 | 120 | 70 |
| EXAMPLE 2 | 9 | 522 | 140 | 80 |
| EXAMPLE 3 | 9 | 540 | 180 | 85 |
| EXAMPLE 4 | 9 | 517 | 121 | 65 |
| EXAMPLE 5 | 9 | 533 | 105 | 70 |
| COMPARATIVE EXAMPLE 1 | 7 | 447 | 122 | 60 |
| COMPARATIVE EXAMPLE 2 | 8 | 413 | 116 | 112 |
| COMPARATIVE EXAMPLE 3 | 11 | 490 | 140 | 80 |
| COMPARATIVE EXAMPLE 4 | 9 | 482 | 103 | 105 |
| COMPARATIVE EXAMPLE 5 | 9 | 616 | 216 | 106 |

(3) Evaluation of Samples (3.1) Evaluation of Transmittances

Each sample of Examples 1-5 and Comparative Examples 1-5 were evaluated from the point of view of the transmittances to the light of the wavelength of 405 nm on the basis of the results of the aforesaid "Measurement of Transmittances." The evaluation results are shown in Table 4. The standards of "○," "Δ," and "×" in Table 4 are as follows.

"○": transmittance of 93% or more
"Δ": transmittance of 91% or more and less than 93%
"×": transmittance of less than 91%

(3.2) Evaluation of Pupil Transmittance

Each sample of Examples 1-5 and Comparative Examples 1-5 were evaluated from the point of view of the transmittances on the basis of the results of the aforesaid "Measurement of Pupil Transmittances." The evaluation results are shown in Table 4. The standards of "○," "Δ," and "×" in Table 4 are as follows.

"○": transmittance of 87% or more
"Δ": transmittance of 85% or more and less than 87%
"×": transmittance of less than 85%

(3.3) Evaluation of Environment Resistance

The following heat resistance tests and high temperature and high humidity tests of each sample of Examples 1-5 and Comparative Examples 1-5 were performed, and environment resistance was evaluated on the basis of the test results. The evaluation results are shown in Table 4. The standards of "○," "Δ," and "×" in Table 4 are as follows.

Heat resistance test: after being left for 168 hours under the environment of a temperature of 85° C., the external appearances of the surfaces of function films were evaluated in a room temperature environment.

High temperature and high humidity test: after being left for 168 hours under the environment of a temperature of 60° C. and a humidity of 90%, the external appearances of the surfaces of function films were evaluated in a room temperature environment.

"○": no changes after heat resistance tests (85° C.) and high temperature and high humidity tests by external appearance evaluation "Δ": although extremely slight changes of the film surfaces of the antireflective films were found after heat resistance tests (85° C.) and high temperature and high humidity tests by external appearance evaluation, the changes was within a practically allowable range "×": cracks or film exfoliation were produced on the film surfaces of the antireflective films in either the heat resistance tests (85° C.) or the high temperature and high humidity tests by external appearance evaluation (3.4) Evaluation of Light Resistance In the atmosphere of a temperature of 85° C. and a relative humidity of 5%, after a light of the wavelength of 405 nm had been made to be a parallel light with a collimator lens, the parallel light was condensed onto each sample of Examples 1-5 and Comparative Examples 1-5. The light intensities at the time of entering the S1 surfaces were set to be 25 mW/mm². The external appearances of the film surfaces of the antireflective films at the time when the irradiation time elapsed 200 hours were observed, and the amounts of the changes of the surface shapes of the film surfaces were measured with a surface roughness meter. The light resistance of each sample of Examples 1-5 and Comparative Examples 1-5 was evaluated from the measurement results. The evaluation results are shown in Table 4. The standards of "○," "Δ," and "×" in Table 4 are as follows.

"○": no changes after the elapsing of 200 hours
"Δ": although extremely slight deformations of the surface shapes were found after the elapsing of 200 hours, the deformations were within a practically allowable range
"×": film exfoliation, cracks, or the deformations of the surface shapes were produced after the elapsing of 200 hours (3.5) Comprehensive Evaluation Each sample of Examples 1-5 and Comparative Examples 1-5 was comprehensively evaluated from the point of view of whether the sample was the optimal one as an objective lens or not (whether the sample reached the practical level or not) on the basis of the aforesaid results. The evaluation results are shown in Table 4. The standards of "○" and "×" in Table 4 are as follows.

"○": superior to the practical level (the results of the tests mentioned above were all "○")
"×": inferior to the practical level (the results of the tests mentioned above included at least one of "Δ" or "×")

TABLE 4

| SAMPLE | TRANSMITTANCE | PUPIL TRANSMITTANCE (OUTERMOST CIRCUMFERENCE) | ENVIRONMENT RESISTANCE | LIGHT RESISTANCE | COMPREHENSIVE EVALUATION |
|---|---|---|---|---|---|
| EXAMPLE 1 | ○ | ○ | ○ | ○ | ○ |
| EXAMPLE 2 | ○ | ○ | ○ | ○ | ○ |
| EXAMPLE 3 | ○ | ○ | ○ | ○ | ○ |
| EXAMPLE 4 | ○ | ○ | ○ | ○ | ○ |
| EXAMPLE 5 | ○ | ○ | ○ | ○ | ○ |
| COMPARATIVE EXAMPLE 1 | Δ | X | ○ | ○ | X |
| COMPARATIVE EXAMPLE 2 | ○ | ○ | X | X | X |
| COMPARATIVE EXAMPLE 3 | ○ | X | ○ | ○ | X |
| COMPARATIVE EXAMPLE 4 | ○ | X | X | Δ | X |
| COMPARATIVE EXAMPLE 5 | ○ | ○ | X | Δ | X |

(4) Conclusion

When the samples of Examples 1-5 and Comparative Examples 1-5 are compared with each other, it is found that the samples of Examples 1-5 have higher transmittances and are superior also in the aspects of the environment resistance and the light resistance from the results of Table 4. From the above, it is found that it is useful to form an antireflective film on the surface (S1 surface) of an objective lens, the antireflective film meeting the condition as follows: the band is in a range from 700 nm to 800 nm, in a state where the reflectance of a light flux entering the central portion of the S1 surface perpendicularly to the central portion in a wavelength region from 400 nm to 1,200 nm is 3.0% or less.

[Embodiment 2]

(1) Production of Sample and Their Characteristics

Antireflective films composed of a plurality of layers shown in Tables 5, 5' were formed on the same molded articles as those used in Embodiment 1, and these five samples were set as "Examples 6-10" according to the film types of the antireflective films.

[Tables 5, 5']

TABLE 5

ANTIREFLECTIVE FILM (S1 SURFACE)

| | EXAMPLE 6 | | EXAMPLE 7 | | EXAMPLE 8 | |
|---|---|---|---|---|---|---|
| LAYER NO. | MATERIAL | FILM THICKNESS AT CENTRAL PART (nm) | MATERIAL | FILM THICKNESS AT CENTRAL PART (nm) | MATERIAL | FILM THICKNESS AT CENTRAL PART (nm) |
| 11 | — | — | — | — | — | — |
| 10 | — | — | — | — | L5 | 113 |
| 9 | — | — | — | — | $ZrO_2$ | 107 |
| 8 | — | — | L5 | 115 | $SiO_2$ | 35 |
| 7 | L5 | 115 | $ZrO_2$ | 39 | $ZrO_2$ | 19 |
| 6 | $ZrO_2$ | 48 | $SiO_2$ | 22 | L5 | 85 |
| 5 | $SiO_2$ | 14 | $ZrO_2$ | 60 | $ZrO_2$ | 17 |
| 4 | $ZrO_2$ | 98 | L5 | 10 | L5 | 37 |
| 3 | L5 | 34 | $ZrO_2$ | 40 | $ZrO_2$ | 48 |
| 2 | $ZrO_2$ | 27 | L5 | 29 | $SiO_2$ | 12 |
| 1 | $SiO_2$ | 229 | $ZrO_2$ | 24 | $ZrO_2$ | 180 |
| | BASE MATERIAL | | BASE MATERIAL | | BASE MATERIAL | |

TABLE 5'

| | ANTIREFLECTIVE FILM (S1 SURFACE) | | | | ANTIREFLECTIVE FILM (S2 SURFACE) | |
|---|---|---|---|---|---|---|
| | EXAMPLE 9 | | EXAMPLE 10 | | EXAMPLES 6-10 | |
| LAYER NO. | MATERIAL | FILM THICKNESS AT CENTRAL PART (nm) | MATERIAL | FILM THICKNESS AT CENTRAL PART (nm) | MATERIAL | FILM THICKNESS AT CENTRAL PART (nm) |
| 11 | — | — | L5 | 109 | | — |
| 10 | L5 | 122 | $ZrO_2$ | 36 | | |
| 9 | $ZrO_2$ | 46 | $SiO_2$ | 20 | | |
| 8 | $SiO_2$ | 29 | $ZrO_2$ | 80 | | |

TABLE 5'-continued

| | ANTIREFLECTIVE FILM (S1 SURFACE) | | | | ANTIREFLECTIVE FILM (S2 SURFACE) | |
|---|---|---|---|---|---|---|
| | EXAMPLE 9 | | EXAMPLE 10 | | EXAMPLES 6-10 | |
| LAYER NO. | MATERIAL | FILM THICKNESS AT CENTRAL PART (nm) | MATERIAL | FILM THICKNESS AT CENTRAL PART (nm) | MATERIAL | FILM THICKNESS AT CENTRAL PART (nm) |
| 7 | $ZrO_2$ | 60 | L5 | 17 | | |
| 6 | L5 | 10 | $ZrO_2$ | 32 | | |
| 5 | $ZrO_2$ | 12 | L5 | 12 | | |
| 4 | L5 | 32 | $ZrO_2$ | 10 | | |
| 3 | $ZrO_2$ | 36 | L5 | 37 | | |
| 2 | $SiO_2$ | 61 | $ZrO_2$ | 10 | | |
| 1 | $ZrO_2$ | 15 | $SiO_2$ | 169 | | |
| | BASE MATERIAL | | BASE MATERIAL | | BASE MATERIAL | |

(2) Characteristics of Samples

Figure 5:
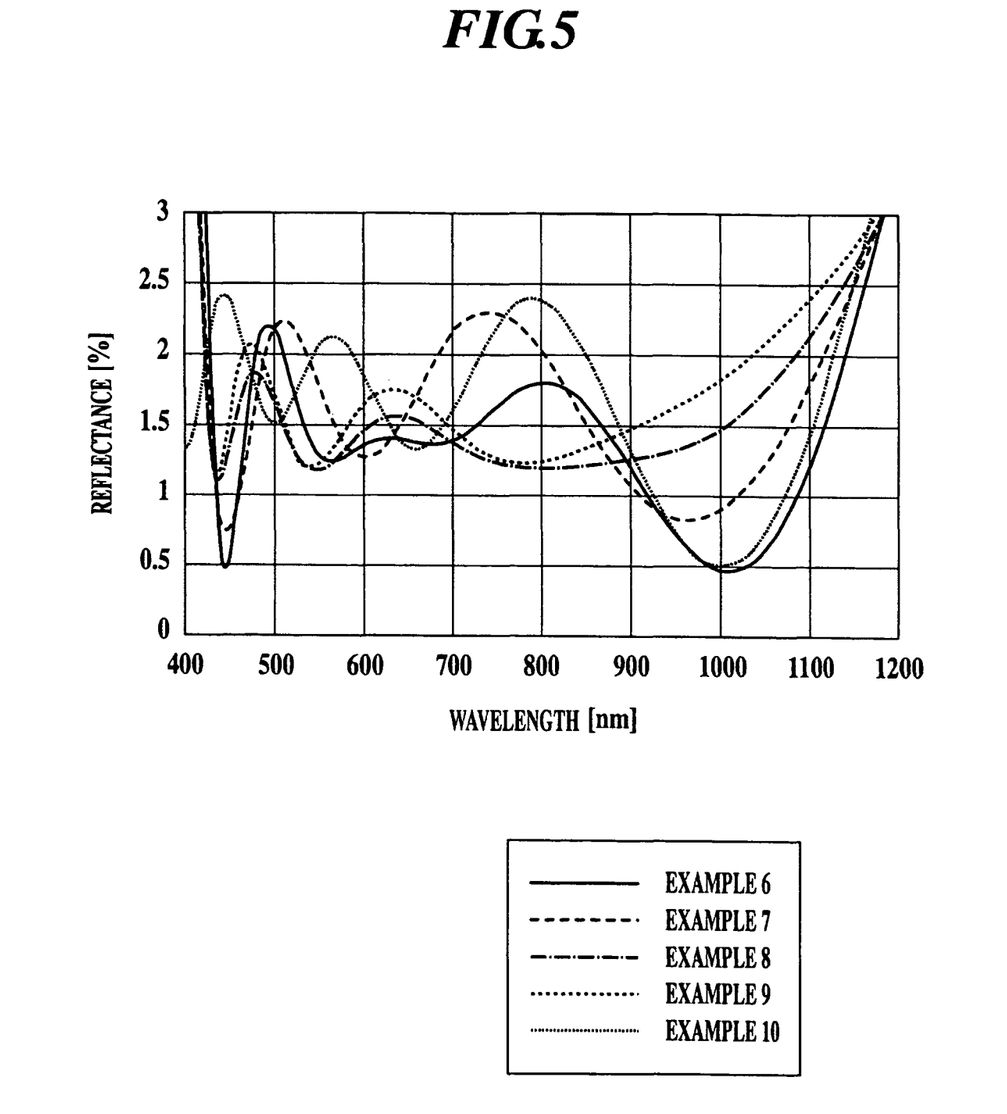
FIG. 5 is a schematic diagram showing relations between the wavelengths and the reflectances of samples according to preferable examples of the present invention (examples 6-10).

The measurement of the reflectances, the measurement of the transmittances, the measurement of the pupil transmittances, and the observation of the antireflective films of each sample of Examples 6-10 were performed similarly to Embodiment 1, and the results are shown in FIG. 5 and Tables 6, 6', 6".

[Tables 6, 6', 6"]

TABLE 6

| SAMPLE | BAND IN WHICH REFLECTANCE IS 3.0% OF LESS IN WAVELENGTH REGION FROM 400 nm TO 1200 nm (nm) | | MEAN REFLECTANCE IN WAVELENGTH REGION FROM 1100 nm TO 1200 nm (%) |
|---|---|---|---|
| EXAMPLE 6 | 755 | ○ | 2.28 |
| EXAMPLE 7 | 762 | ○ | 2.51 |
| EXAMPLE 8 | 762 | ○ | 2.67 |
| EXAMPLE 9 | 759 | ○ | 2.80 |
| EXAMPLE 10 | 769 | ○ | 2.60 |

TABLE 6'

| | TRANSMITTANCE (%) | | | TRANSMITTANCE OF WAVELENGTH OF 405 nm ON OUTERMOST |
|---|---|---|---|---|
| SAMPLE | 405 nm | 655 nm | 780 nm | CIRCUMFERENCE (%) |
| EXAMPLE 6 | 93.8 | 96.8 | 97.9 | 90.3 |
| EXAMPLE 7 | 93.3 | 96.3 | 97.6 | 87.3 |
| EXAMPLE 8 | 93.6 | 96.5 | 97.2 | 86.0 |
| EXAMPLE 9 | 93.4 | 96.4 | 97.0 | 85.7 |
| EXAMPLE 10 | 93.7 | 96.4 | 97.2 | 87.8 |

TABLE 6"

| | ANTIREFLECTIVE FILM | | | |
|---|---|---|---|---|
| SAMPLE | NUMBER OF LAYERS | TOTAL FILM THICKNESS (nm) | MAXIMUM THICKNESS OF L MATERIAL (nm) | MAXIMUM THICKNESS OF H MATERIAL (nm) |
| EXAMPLE 6 | 7 | 565 | 228 | 98 |
| EXAMPLE 7 | 8 | 340 | 115 | 60 |
| EXAMPLE 8 | 10 | 418 | 113 | 101 |
| EXAMPLE 9 | 10 | 421 | 121 | 60 |
| EXAMPLE 10 | 11 | 531 | 169 | 80 |

(3) Evaluation of Samples

Evaluations of the environment resistance and the light resistance of the samples "Examples 1-5" produced in Embodiment 1 and the samples "Examples 6-10" were performed similarly to Embodiment 1, and the results are shown in Table 7.

[Table 7]

TABLE 7

| SAMPLE | ENVIRONMENT RESISTANCE | LIGHT RESISTANCE |
|---|---|---|
| EXAMPLE 1 | ○ | ○ |
| EXAMPLE 2 | ○ | ○ |
| EXAMPLE 3 | ○ | ○ |
| EXAMPLE 4 | ○ | ○ |
| EXAMPLE 5 | ○ | ○ |
| EXAMPLE 6 | Δ | ○ |
| EXAMPLE 7 | ○ | Δ |
| EXAMPLE 8 | ○ | Δ |
| EXAMPLE 9 | ○ | Δ |
| EXAMPLE 10 | Δ | ○ |

From the results of Table 7, it is found that the environment resistance and the light resistance are especially superior when the antireflective films of the present invention are particularly configured in nine layers.

The entire disclosure of Japanese Patent Application No. 2007-221222 filed on Aug. 28, 2007 including description, claims, drawings, and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. An objective lens used for an optical pickup apparatus to perform writing and/or reading of an optical information recording medium by light from a light source, comprising an antireflective film on a surface of a light source side, wherein a light flux of a plurality of wavelengths including a wavelength λ1 which is within a range of 380 nm≦λ1≦420 nm and a wavelength λ2 which is within a range of 630≦λ2≦810 nm, is condensed on the optical information recording medium by the objective lens, a numerical aperture on the light source side with respect to the wavelength λ1 is within a range from 0.8 to 0.9, the numerical aperture on the light source side with respect to the wavelength λ2 is 0.7 or less, the number of layers of the antireflective film is 7 or more, and a band of the antireflective film is within a range from 700 nm to 800 nm in a state where a reflectance of a light flux perpendicularly entering a central portion of the surface in a wavelength region from 400 nm to 1200 nm is continuously 3.0% or less, wherein the band of the antireflective film is a difference between an upper limit and a lower limit of wavelengths that satisfy the reflectance of 3.0% or less among the wavelength region from 400 nm to 1200 nm.

2. The objective lens of claim 1 comprising the antireflective film on the surface of the light source side, wherein a mean reflectance of the light flux perpendicularly entering the central portion of the surface in a wavelength region from 1100 nm to 1200 nm is within a range from 2.0% to 3.5%.

3. The objective lens of claim 1, wherein the wavelength $\lambda 2$ comprises:

a first wavelength $\lambda 2a$ which is in a range of 630 nm$\leq \lambda 2a \leq$670 nm; and a second wavelength $\lambda 2b$ which is in a range of 760 nm$\leq \lambda 2b \leq$810 nm.

4. The objective lens of claim 1, wherein a maximum incident and outgoing angle θmax of the light flux of the wavelength $\lambda 1$ on the surface of the light source side is in a range of 60°$\leq$θmax$\leq$72°.

5. The objective lens of claim 1, wherein a total film thickness of the antireflective film is within a range from 490 nm to 550 nm.

6. The objective lens of claim 1, wherein the antireflective film comprises a plurality of layers, and the number of the layers of the antireflective film is nine.

7. The objective lens of claim 6, wherein the layers included in the antireflective film comprises at least two layers made of a low refraction index material and a high refraction index material, respectively, a refraction index $n_L$ of the low refraction index material to light of a wavelength of 500 nm is within a range of $1.3 \leq n_L < 1.55$, and a refraction index $n_H$ of the high refraction index material to the light of the wavelength of 500 nm is within a range of $1.8 \leq n_H < 2.1$.

8. The objective lens of claim 7, wherein the low refraction index material comprises $SiO_2$ as a principal component.

9. The objective lens of claim 7, wherein the high refraction index material comprises $ZrO_2$ as a principal component.

10. The objective lens of claim 7, wherein a thickness $T_{L-MAX}$ of the thickest layer among layers configured by the low refraction index material is within a range of 100 nm$\leq T_{L-MAX} <$190 nm.

11. The objective lens of claim 7, wherein a thickness $T_{H-MAX}$ of the thickest layer among layers configured by the high refraction index material is within a range of 65 nm$\leq T_{H-MAX} <$90 nm.

12. The objective lens of claim 1, further comprising a second antireflective film including a plurality of layers on an opposite side of the light source side, the opposite side facing to the optical information recording medium, wherein the number of the layers of the second antireflective film is five or seven.

13. The optical pickup apparatus comprising the objective lens of claim 1, wherein the objective lens is formed by a plastic molding.

* * * * *